US005308949A

United States Patent [19]

Reed, Jr. et al.

[11] Patent Number: 5,308,949

[45] Date of Patent: May 3, 1994

[54] NOZZLE ASSEMBLY FOR PLASMA ARC CUTTING TORCH

[75] Inventors: E. Smith Reed, Jr., Hanover; Richard G. Ellis, W. Lebanon, both of N.H.

[73] Assignee: Centricut, Inc., West Labanon, N.H.

[21] Appl. No.: 966,973

[22] Filed: Oct. 27, 1992

[51] Int. Cl.[5] .......................... B23K 9/00; B23K 10/00

[52] U.S. Cl. ............................ 219/121.5; 219/121.39; 219/121.51; 219/75

[58] Field of Search ...................... 219/74, 75, 121.48, 219/121.49, 121.39, 121.5, 121.51, 121.52; 313/231.31, 231.41

[56] References Cited

U.S. PATENT DOCUMENTS 4,891,489 1/1990 Bollinger et al. .............. 219/121.48
4,954,688 9/1990 Winterfeldt ...................... 219/121.5
5,013,885 5/1991 Carkhuff et al. ............... 219/121.51
5,124,525 6/1992 Severance, Jr. et al. ........ 219/121.5
5,147,997 9/1992 Haberman ........................ 219/121.5

*Primary Examiner*—Mark H. Paschall
*Attorney, Agent, or Firm*—Howson & Howson

[57] ABSTRACT

A plasma arc torch for cutting metal with the heat of a constricted arc and removing the molten material with a jet of hot ionized gases comprises a nozzle assembly in the torch includes a nozzle base and an insulator with a constricting orifice. The base and insulator are spaced from each other to form a flow path for a coolant such as water. An interference fit between the base and the insulator exerts a radially outward force on the insulator to enable the base and insulator to be assembled and disassembled with a pressing or pulling force in the approximate range of 0.3 to 16.0 pounds.

8 Claims, 4 Drawing Sheets

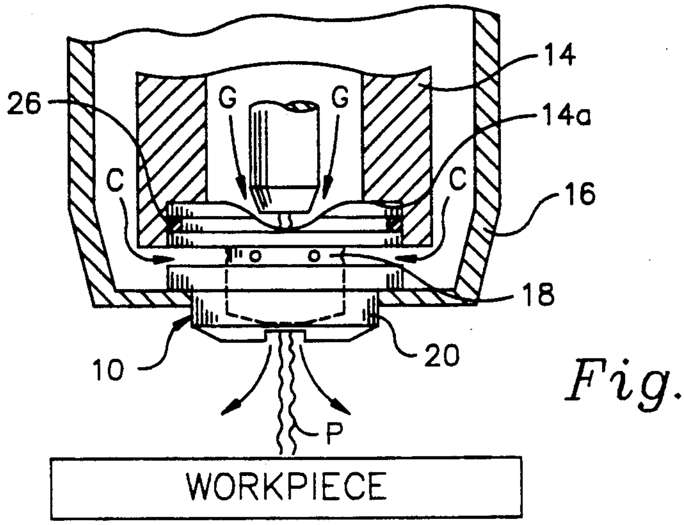
Fig. 1
Fig. 3
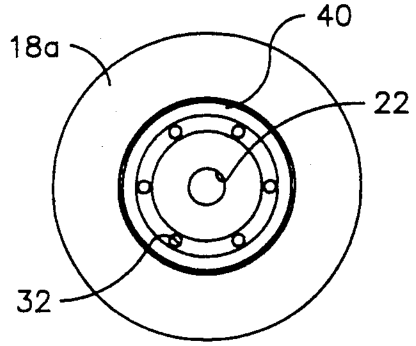
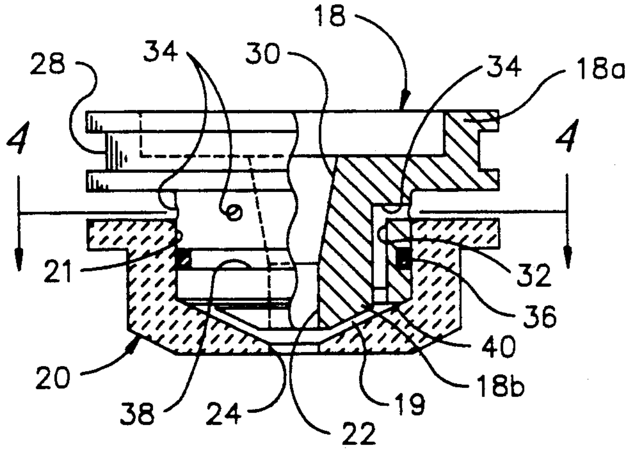
Fig. 2
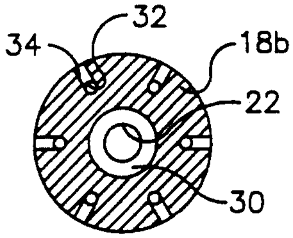
Fig. 4

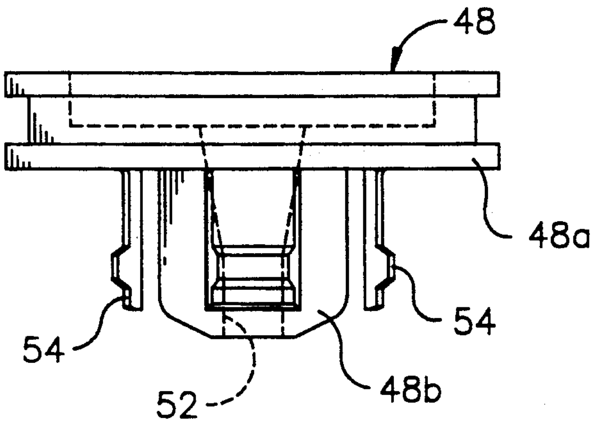
Fig. 5
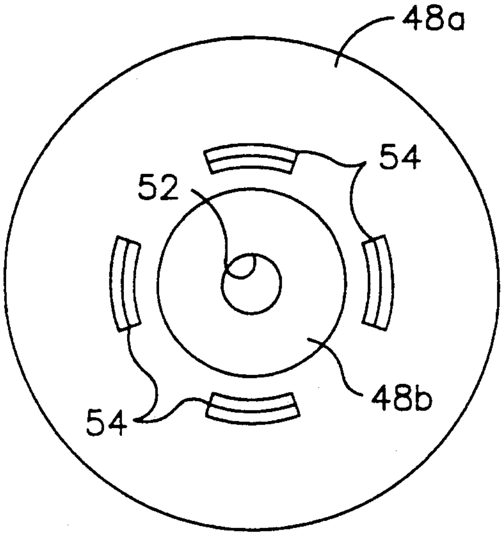
Fig. 6
Fig. 7
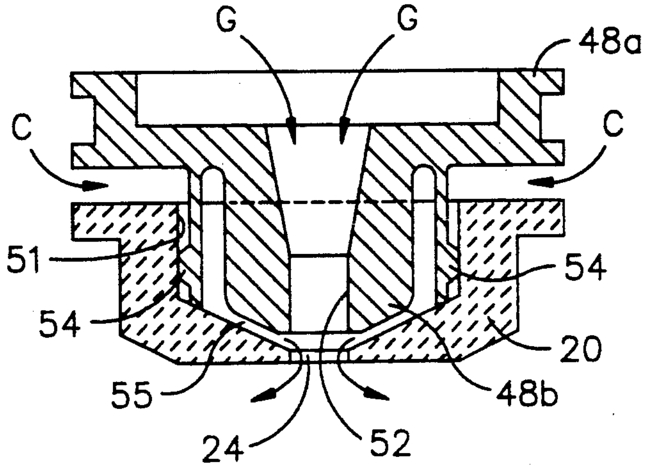

Fig. 8a
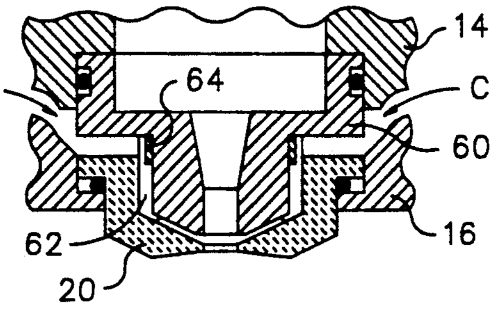
Fig. 9a
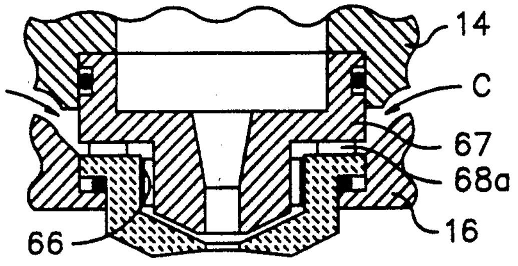
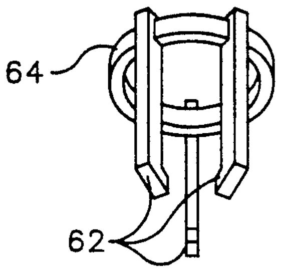
Fig. 8b
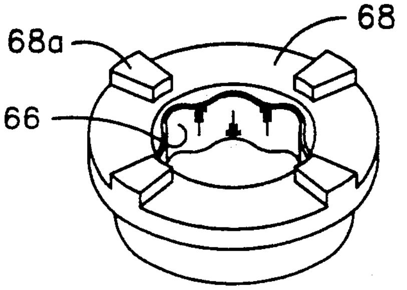
Fig. 9b
Fig. 10a
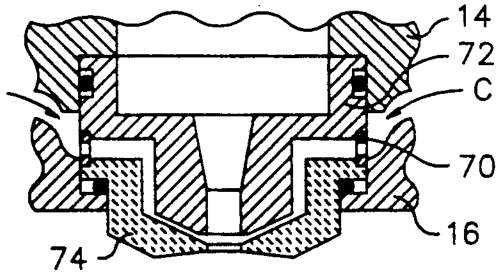
Fig. 11a
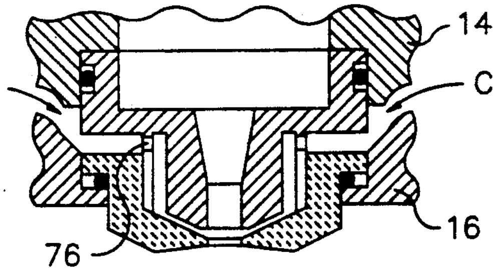
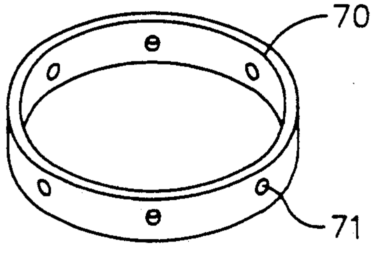
Fig. 10b
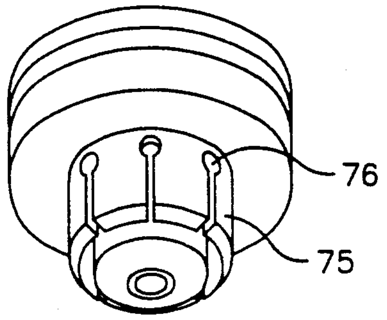
Fig. 11b Fig. 12a
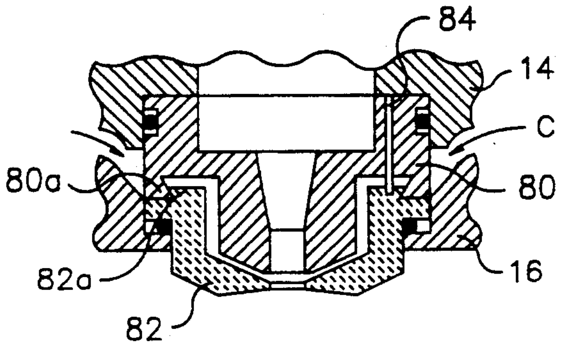
Fig. 13
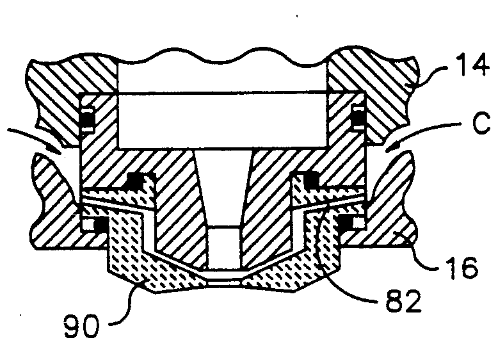
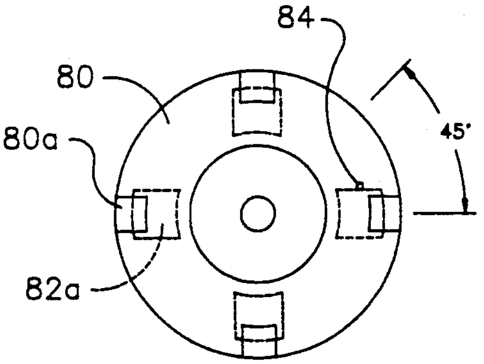
Fig. 12b

NOZZLE ASSEMBLY FOR PLASMA ARC CUTTING TORCH

BACKGROUND OF THE INVENTION

This invention relates generally to plasma jet cutting equipment, and more specifically to a novel and improved nozzle assembly suitable for use in plasma arc cutting torches.

In transferred arc plasma jet cutting equipment, a device, commonly referred to as a "torch", uses gas flow and heat generated by an electric arc to "cut" through a metallic workpiece. A direct current electrical arc and ionized gas, between an electrode (the cathode) located in the center of the torch and the workpiece (the anode), create a jet of hot plasma through a constricting nozzle located between the electrode and the workpiece. The jet has sufficient heat and force to slice through the struck portion of the workpiece.

Current state-of-the-art nozzles are constructed from an electrically conductive material, usually copper. Unfortunately, when significant electrical power is applied to the cutting operation, there can occur a phenomenon known as "double arcing", in which the plasma arc does not pass directly through the center of the nozzle orifice, but instead deflects to the nozzle wall before reaching the workpiece.

The most common technique for combating double arcing is to add a ceramic electrical insulator with an orifice between the nozzle and the workpiece. Present designs position the insulator slightly away from the nozzle to form a gap between the two components around the orifice. This provides a conduit for cutting shield gases and cooling gases or water to be introduced for such purposes as improving the quality of the plasma arc cut, cooling the nozzle to extend its life, and helping constrict the size of the cutting arc for deeper or better cuts. The size of the gap between the nozzle and insulator is a very important determinant to the quality of cut and useful lives of the nozzle and insulator. Popular designs in plasma arc torches therefore utilize a nozzle assembly of two or more components, including a copper nozzle base and a ceramic insulator. The gap between these components is carefully controlled. These designs also provide a flow path for injecting coolant water into the plasma orifice area.

To assure a good quality of cut, and a long life for the components, the orifices of the insulator and the nozzle base must remain concentric with each other at all times, and the thickness of the coolant water flow path, as determined by the gap between the nozzle base and insulator, must be maintained within very close tolerances. Heretofore, these requirements have been achieved either by permanently bonding the insulator to the nozzle base, with glue for instance, or by assembling the insulator to the nozzle base with additional components. Typically, these include a centering sleeve fitted around the outside of the insulator and nozzle base to assure concentricity, and a spacer fitted between the nozzle base and insulator to assure a proper gap for coolant water flow.

There are several significant disadvantages to the above described plasma torch nozzle assemblies. Where the nozzle assembly, the nozzle base and the insulator are permanently attached to one another, the nozzle base frequently wears out long before the insulator under normal cutting operations. On the other hand, material irregularities in the workpiece may cause the insulator to contact the workpiece accidentally and produce irreparable damage to the insulator without harming the nozzle base. In either case the torch operator must discard and replace the entire nozzle assembly. Consequently, more money is spent for replacements than is truly necessary.

In nozzle assemblies having additional detachable components, a significant disadvantage is the overall cost of producing and assembling the additional components. Also, where a centering sleeve is fitted around the outside of the insulator with an inwardly directed gripping force, it is directly in the flow path of the cooling water and therefore interferes with flow. The centering sleeve must therefore include water passage holes, gaps, notches or spaces, all of which add significantly to manufacturing costs. Another disadvantage in using additional components is the difficulty of reassembling them with the nozzle and insulator after the torch operator has replaced the worn or broken component. Replacing only one component of the assembly requires painstaking re-balancing of the various components upon each other in order to complete reassembly successfully. Consequently, more is expended at the outset to maintain a complete inventory of nozzle assemblies.

SUMMARY OF THE INVENTION

Accordingly, it is an object of the present invention to provide an economical and improved nozzle assembly for plasma arc cutting equipment.

Another object is to provide a plasma arc torch nozzle assembly which can be easily disassembled and assembled in order to replace individual defective components.

A further object of the invention is to provide a unique nozzle assembly having individually replaceable components which can be easily assembled within the close tolerances required for optimum cutting performance.

A still further object is to provide a nozzle assembly which can be quickly disassembled or assembled manually by a simple pulling, pushing or twisting motion of the hand.

Briefly, these and other objects and advantages of the invention are accomplished by an improved nozzle assembly for a plasma arc cutting torch in which a nozzle base is precisely held in concentric alignment with an insulator, and which includes means for maintaining a precise spacing between the insulator and the nozzle base. In a number of preferred embodiments, a resilient means is interposed between the nozzle base and the insulator for exerting a radially outward force on an inner surface of the insulator from the central axis thereof to produce frictional resistance when the insulator is moved relative to the nozzle base.

In one preferred embodiment, the insulator receives the nozzle base in a bore terminating in a conical wall around the insulator orifice. An annular base around the nozzle base interengages the conical wall at its perimeter to fix the gap width around the orifice area. Conduits formed in the nozzle base provide a water flow path to the gap. An elastic 0-ring around the nozzle base provides a snug interference fit with the insulator.

In another preferred embodiment, the nozzle base is inserted in the insulator with the orifices held in snug concentric alignment by spring-like fingers extending along the insertion length nozzle base. The insertion depth of the nozzle base is limited by the length of the fingers to provide the gap, and space between the fingers provide a flow path for the cooling water to the gap.

Other objects, details and advantages of the invention, will be apparent from the following detailed description when read in conjunction with the accompanying drawings.

BRIEF DESCRIPTION OF THE DRAWINGS

FIG. 1 is a schematic representation, partially in axial cross section, of a portion of a plasma arc cutting torch with a nozzle assembly according to a first embodiment of the invention;

FIG. 2 is a side view of a nozzle assembly, partially in axial cross section, utilized in the torch of FIG. 1;

FIG. 3 is an end view of a nozzle base in the assembly of FIG. 2;

FIG. 4 is a view in cross section of the nozzle base taken on plane 4—4 in FIG. 2;

FIG. 5 is a side view of an alternate embodiment of a nozzle base according to the invention for use in the torch of FIG. 1;

FIG. 6 is an end view of the nozzle base of FIG. 5;

FIG. 7 is an axial cross section of a nozzle assembly utilizing the nozzle base of FIG. 5;

FIGS. 8*a*, 9*a*, 10*a*, 11*a*, 12*a* and 13 are radial sections showing additional nozzle assembly configurations according to the invention;

FIGS. 8*b* and 10*b* are perspective views showing spacers as used in the embodiments of FIGS. 8*a* and 10*a* respectively;

FIG. 9*b* is a perspective view of an insulator used in the embodiment of 9*a;*

FIG. 11*b* is a perspective view of an insulator used in the embodiment of FIG. 11*a;* and FIG. 12*b* is a plan view of the insulator used in the embodiment of FIG. 12*a*.

DETAILED DESCRIPTION

Referring now to the drawings wherein like referenced characters designate like or corresponding parts throughout the several views, there is shown in FIG. 1 a generally cylindrical nozzle assembly 10 according to the invention, installed at the end of a typical plasma arc cutting torch, such as a Hypertherm, Inc. Model HT 400 or PAC-500. The torch includes an electrode 12 of an alloy, such as 2% thoriated tungsten, suitable for producing a high current arc on a metal workpiece. Electrode 12 is coaxially positioned within a cylindrical torch body 14 forming thereby an annular primary passage for introducing a gas G into nozzle assembly 10 at a suitably controlled pressure and flow rate. Gas G is usually nitrogen, or a mixture of argon and nitrogen, or argon and hydrogen, depending on the equipment used and the metal being cut. Gas G is directed through nozzle assembly 10 and becomes ionized by the arc to form a well-collimated, intensely hot, plasma jet sufficient to melt and expel metal from the workpiece. Nozzle assembly 10 is retained in a recess 14*a* in the end of torch body 14 by a collar formed on the end of a cylindrical retaining cap 16. The wall of cap 16 is concentrically spaced around torch body 14 to form thereby an annular secondary passage for introducing a coolant C, such as water or gas, to nozzle assembly 10.

Referring to the details in FIGS. 2–4, assembly 10 includes a nozzle base 18 and an insulator 20 with aligned constricting orifices 22 and 24, respectively, through which the plasma jet passes. Base 18 is retained in recess 14*a* by an interference fit of an O-ring 26 in a groove 28 around a shoulder section 18*a* of base 18. A neck section 18*b* projecting from section 18*a* includes a tapered bore 30 for directing gas G from torch body 14 to orifices 22 and 24. It is retained by an outwardly exerted interference fit in a bore 21 of insulator 20 by an O-ring 36 in a groove 38 around neck section 18*b*.

The insertion depth of assembly 18 in insulator 20 is limited by a rim 40 jutting beyond the end of neck section 18*b* at the perimeter to provide an annular plenum 19 around orifices 22 and 24 between assembly 18 and insulator 20. A plurality of parallel passages 32 in neck section 18*b* communicating with plenum 19 terminate adjacent to shoulder 18*a* with radial holes 34 to provide a continuous flow path for coolant C from the retaining cap 16 to the orifice area.

It is therefore possible for a defective base 18 or insulator 20 to be replaced separately if worn or broken without having to replace the other still useful component. The torch operator simply removes cap 16 from the torch and, with slight finger pressure, replaces only the defective component. The interference fit of O-rings 26 and 36 is selected to require a thrust in an approximate range of 0.3 to 16 pounds with rotational motion not exceeding 160°.

Referring to FIGS. 5–7, there is shown an alternate embodiment of the invention in which a nozzle base 48 is retained in precise alignment in insulator 20 by integral spring means while maintaining a continuous flow path for coolant C. A shoulder section 48*a*, and a neck section 48*b* extending therefrom, concentrically position an orifice 52 therein in spaced relation with insulator orifice 24. A plurality of resilient fingers 54 spaced around neck 48*b* extend into a bore 51 of insulator 20 and provide a radially outward interference fit with the insulator. The ends of fingers 54 axially jut beyond neck 48*b* at its perimeter to limit the insertion depth of nozzle base 48 and form thereby a plenum 55 between neck section 48*b* and insulator 20 around the orifices. This configuration of the nozzle base also produces a continuous flow path for coolant C to the orifices through the gaps between adjacent fingers 54.

Other nozzle assembly configurations are contemplated within the spirit and scope of the invention. For example, FIGS. 8*a* and 8*b* illustrate a nozzle assembly in which a passage is maintained between a nozzle base 60 and insulator 20 by spring-like fingers 62 integrally formed about a ring 64.

FIGS. 9*a* and 9*b* show a nozzle assembly in which a generally wavy circular spring 66 retains a nozzle base 67 concentric with an insulator 68. Bosses 68*a* formed on the upper surface of insulator 68 and spring 66 spatially maintain a continuous flow path for coolant C to the orifice area.

FIGS. 10*a* and 10*b* utilize an elastic centering sleeve 70 in a nozzle assembly to provide separation between a nozzle base 72 and insulator 74, while, at the same time, assuring alignment of their respective orifice holes. Holes 71 in sleeve 70 provide the continuous flow path for coolant C.

FIGS. 11*a* and 11*b* illustrate an embodiment similar to that of FIG. 5 except the fingers are formed in a cylindrical shroud 75 by keyhole-like slots 76.

FIGS. 12*a* and 12*b* show a nozzle base 80 and insulator 82 modified at their interface with complementary beveled bosses 80*a* and 82*a*, respectively, to provide bayonet-type interengagement. That is, a 45° relative twist in opposite directions engages and disengages the bosses. A removable pin 84 prevents the base 80 and insulator 82 from loosening. The space between bosses 80a and 82a provide a continuous flow path for coolant C.

FIG. 13 illustrates a modified insulator 90 which includes radial holes 82 for introducing coolant C to the space between the nozzle base and insulator 90.

Some of the many novel features and advantages of the invention should now be readily apparent. For example, exclusive of O-rings, none of the illustrated nozzle assemblies contains more than three components for achieving the required close tolerance and orifice concentricity. The components are located around the interior of the insulator. The interfering component exerts an outward force on the insulator without obstructing flow of coolant. The nozzle base and the insulator orifice are contained in precise alignment by the unique structural interfaces within close tolerances by virtue of the "stop point" surfaces. These features enable nozzle assembly to be manufactured at relatively low cost, and provide for easy disassembly and re-assembly with the assurance that close tolerances, orifice concentricity and gap width for coolant flow are met. The proper choice of spring preloading also assures an interference fit which allows easy assembly by hand.

It will be understood that various changes in the details, materials, steps and arrangement of parts, which have been herein described and illustrated in order to explain the nature of the invention, may be made by those skilled in the art without departing from the principle and scope of the invention as expressed in the appended claims.

We claim:

1. A plasma arc cutting torch comprising:

an electrically conductive nozzle base having a passage, extending along an axis, for the flow of plasma gas, said passage having an inlet end and an opposite outlet end, and the nozzle base having an end surface transverse to the axis of the passage and surrounding said outlet end;

an electrode located in proximity to the inlet end of the passage in the nozzle base; and an electrical insulator having an interior space receiving a portion of said nozzle base, the interior space being defined by a substantially cylindrical interior wall of the insulator surrounding the nozzle base and coaxial with the axis of the passage of the nozzle base, and by an interior end wall extending transverse to said axis and facing said end surface of the nozzle base, the insulator having an orifice in said end wall for the flow of plasma gas, the orifice also being coaxial with said axis and aligned with the outlet end of the passage of the nozzle base; and means, constituted by a first unitary part of said nozzle base, engaging said interior end wall of the insulator, and maintaining a narrow space between said interior end wall of the insulator and said transverse end surface of the nozzle base, for the flow of coolant through said narrow space toward said orifice.

2. A plasma arc cutting torch according to claim 1 further comprising means, constituted by a second unitary part of said nozzle base, engaging said substantially cylindrical interior wall of the insulator and maintaining said cylindrical interior wall and said orifice in coaxial relationship with said passage of the nozzle base.

3. A plasma arc cutting torch according to claim 1 further comprising resilient means, surrounding said nozzle base and exerting a radial outward force on the substantially cylindrical interior wall of the insulator, thereby frictionally holding the insulator in place on the nozzle base but permitting removal of the insulator from the nozzle base whereby the nozzle base and the insulator can be separately replaced.

4. A plasma arc cutting torch according to claim 1 wherein said first unitary part of the nozzle base comprises a rim surrounding the transverse end surface of the nozzle base and engaged with said interior end wall of the insulator.

5. A plasma arc cutting torch according to claim 1 wherein said first unitary part of the nozzle base comprises a rim surrounding the transverse end surface of the nozzle base and engaged with said interior end wall of the insulator, and wherein said nozzle base includes coolant passage means opening to the transverse end surface of the nozzle base between said rim and said outlet end of the passage of the nozzle base, whereby coolant can flow through said coolant passage means into said narrow space between said interior end wall of the insulator and said transverse end surface of the nozzle base.

6. A plasma arc cutting torch according to claim 1 wherein said first unitary part of the nozzle base comprises a rim surrounding the transverse end surface of the nozzle base and engaged with said interior end wall of the insulator, and including an outer surface on the nozzle base, a groove in said outer surface on the nozzle base, and a resilient O-ring located in said groove and exerting a radial outward force on the substantially cylindrical interior wall of the insulator and maintaining said cylindrical interior wall and said orifice in coaxial relationship with said passage of the nozzle base.

7. A plasma arc cutting torch according to claim 1 wherein said nozzle base includes a radially outwardly extending shoulder surrounding the inlet end of its passage, and in which said first unitary part of the nozzle base comprises a plurality of fingers extending axially from said shoulder, said fingers having ends engaging the interior end wall of the insulator.

8. A plasma arc cutting torch according to claim 1 wherein said nozzle base includes a radially outwardly extending shoulder surrounding the inlet end of its passage, and in which said first unitary part of the nozzle base comprises a plurality of resilient fingers extending axially from said shoulder, said fingers having ends engaging the interior end wall of the insulator, and resiliently exerting radial outward forces on the substantially cylindrical interior wall of the insulator and maintaining said cylindrical interior wall and said orifice in coaxial relationship with said passage of the nozzle base.

* * * * *